United States Patent [19]
Stantial

[11] 3,814,023
[45] June 4, 1974

[54] VERTICALLY ADJUSTABLE SUSPENSION ASSEMBLY

[75] Inventor: Thomas D. Stantial, Long Beach, Calif.

[73] Assignee: The New Standard Company, Inc., Dana Point, Calif.

[22] Filed: June 19, 1973

[21] Appl. No.: 371,377

[52] U.S. Cl. ................ 104/94, 105/154, 248/410, 403/103
[51] Int. Cl. .............................................. B61b 3/00
[58] Field of Search .......... 104/89, 94, 95; 105/148, 105/154–156; 294/19 R, 57, 20–24; 248/410, 321, 335; 403/103, 105, 368, 377

[56] References Cited
UNITED STATES PATENTS
1,204,038 11/1916 Levin ................................ 248/410
2,208,196 7/1940 Pitt ............................ 403/377 X
3,310,003 3/1967 Bryan ................................ 104/94

FOREIGN PATENTS OR APPLICATIONS
584,815 10/1959 Canada ............................ 403/105

Primary Examiner—Lloyd L. King
Assistant Examiner—Andres Kashnikow
Attorney, Agent, or Firm—Sellers and Brace

[57] ABSTRACT

A vertically adjustable suspension assembly of general utility preferably supported on a trolley operating in an overhead track. The assembly includes loose fitting, telescopic tubes the lower one of which supports a clutch plate having a sharp edge projecting through the tube wall and biased into locking engagement with the interior surface of the upper tube to lock the assembly in any selected adjusted position. Operating means at the lower end of the assembly functions to release the clutch and to adjust the tubes to a desired new position. Release of the handle automatically locks the assembly against extension. The assembly is of general utility as, for example in hospitals and sick rooms to support numerous sick room items.

18 Claims, 6 Drawing Figures

PATENTED JUN 4 1974
3,814,023
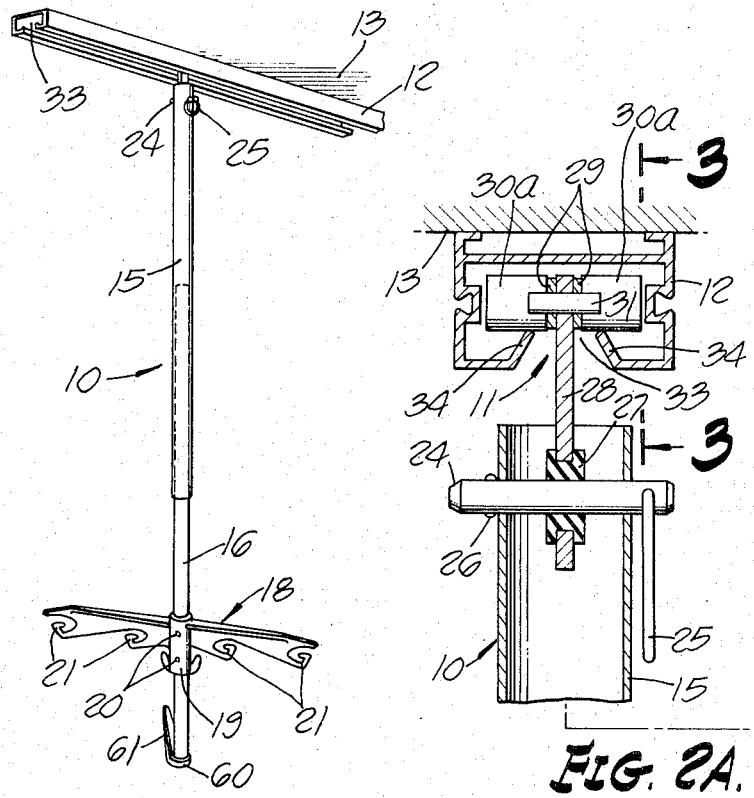
FIG. 1.
FIG. 2A.
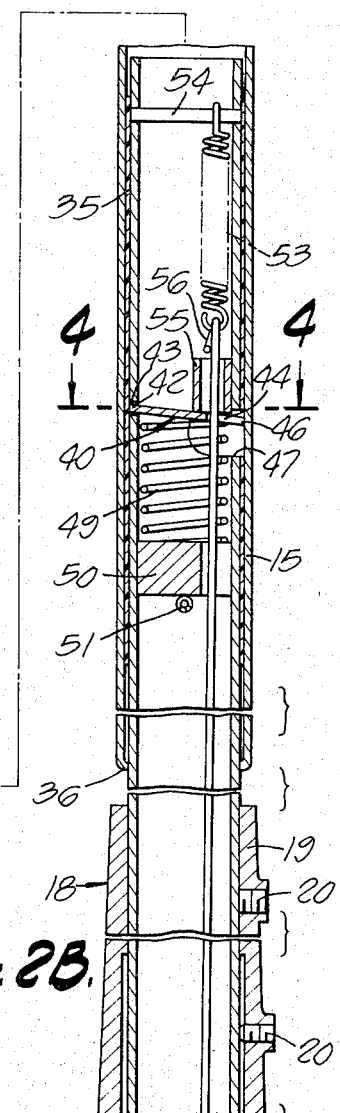
FIG. 2B.
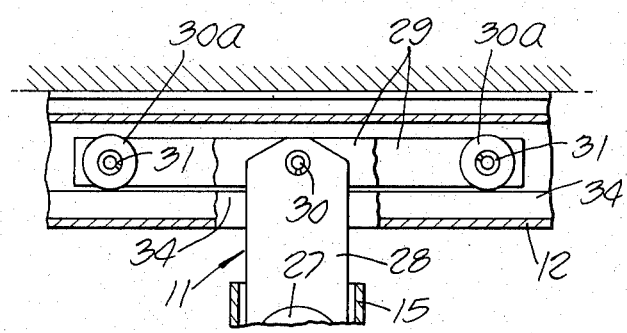
FIG. 3.
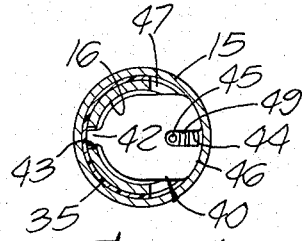
FIG. 4.
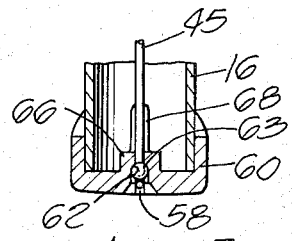
FIG. 5.

3,814,023

VERTICALLY ADJUSTABLE SUSPENSION ASSEMBLY

This invention relates to article support means, and more particularly to an improved self-locking vertically adjustable suspension assembly having smooth surfaced external parts and all working components except the operating handle are concealed.

Various proposals have been made heretofore for a readily extendable and contractable support bracket of general utility as, for example, the support of equipment and articles used in the treatment of patients confined to bed. Heretofore it has been the common practice to mount such supports on the floor and to move them from place to place to meet changing needs. Such floor mounted equipment is open to many obvious objections. Not only is the floor space at a premium and urgently needed for other purposes but the equipment and articles supported thereby are exposed to many hazards. Proposals have been made for mounting such supports on furniture or on a room wall rather than on the floor, but these present similar or other objections and hazards and involve objectionable limitations on the use of the equipment.

The foregoing and other serious objections and shortcomings of previous proposals are avoided by the present invention comprising a very compact, versatile, easily operated suspension assembly preferably supported on a trolley operating in a ceiling mounted trackway. The assembly includes a pair of smoothly telescoping tubes provided with means for limiting the extension movement thereof and fully enclosing simple, highly-reliable positive means for locking the tubes in any adjusted position. The adjustment can be made by grasping the lower end of the assembly in one hand to depress the control handle and then shifting the lower tube to any desired position and relaxing the grip on the operating handle. The two principal tubular sub-units of the suspension assembly are held against disassembly by retainer ball or pin means interconnecting the assembly operating handle to the outer end of one of the tubes and to the clutch mechanism. A suitable bracket designed to support one or more objects is adjustably secured to the outer end of the adjustable tube.

The components are readily disassembled by releasing the retainer ball or pin on the operating handle following which the tubes are readily removed thereby permitting the locking mechanism to be disassembled and removed.

Accordingly it is a primary object of the present invention to provide an easily-operated highly-versatile vertically-adjustable suspension assembly securable to a ceiling or mounted on a trolley operating along a ceiling-supported track or the like.

Another object of the invention is the provision of a vertically adjustable suspension assembly comprising a pair of tubes having a loose sliding fit and one of which encloses simple, foolproof positive clutch means normally locking the tubes against relative extension but readily permitting manual shift to any desired new position.

Another object of the invention is the provision of a vertically adjustable suspension device having all working portions thereof save the operating handle concealed within the assembly.

These and other more specific objects will appear upon reading the following specification and claims and upon considering in connection therewith the attached drawing to which they relate.

Referring now to the drawing in which a preferred embodiment of the invention is illustrated:

FIG. 1 is a perspective view showing a preferred embodiment of the invention suspended from a ceiling-mounted trackway;

FIGS. 2A–2B are longitudinal cross-sectional views taken along a longitudinal axis of the assembly shown in FIG. 1;

FIG. 3 is a cross-sectional view on a reduced scale taken along line 3—3 on FIG. 2A;

FIG. 4 is a cross-sectional view taken along line 4—4 on FIG. 2B; and

FIG. 5 is a cross-sectional view taken along line 5—5 on FIG. 2B.

Referring more particularly to FIG. 1 initially, there is shown a vertically adjusted suspension assembly, designated generally 10, having its upper end supported on a trolley 11 (FIGS. 2A and 3) operating along an inverted channel-shape track 12 secured to the room ceiling 13. The suspension assembly 10 includes a first or outer tube 15 within which a second tube 16 has a loose but smooth sliding fit. Adjustably secured near the lower end of tube 16 is a bracket 18 having a hub 19 slidable along tube 16 and anchored thereto as by set screws 20 (FIG. 2B). Bracket 18 is here shown as provided with hooks 21,21 on which any object to be supported may be hung, such as bottles of plasma, intravenous feeding containers, oxygen tanks and the like.

Assembly 10 is attached to trolley 11 by means of a removable keeper pin 24 having a pull ring 25 at one end and a ball detent 26 protruding from its sidewall and serving to hold the pin in assembled position. Pin 24 extends through a resilient grommet or sleeve 27 supported in an opening through the trolley suspension link 28. The upper end of this link is secured between a pair of strips 29,29 (FIG. 2A) by an assembly bolt or pin 30. Pairs of rollers 30a,30a are mounted on stub shafts 31 passing through the opposite ends of strips 29. The trolley suspension link 28 extends downwardly through the slot 33 between the inturned lips 34 of track 12.

Referring now to FIGS. 2A,2B, 4 and 5, it will be noted that the smaller diameter tube 16 is provided at its upper or inner end with a thin plastic sleeve 35 bonded to the exterior of tube 16. A coating of Teflon is particularly suitable for this sleeve because it provides a smooth operating bearing surface having a close sliding fit with the I.D. of the larger tube 15. The lower end of this sleeve or coating 35 cooperates with the inturned lower rim edge 36 of tube 15 to limit the maximum extension of the two tubes after assembly.

Clutch mechanism effective to lock the two tubes in any desired retracted or extended position includes a clutch plate 40 having the configuration best shown in FIG. 4. This clutch plate has a tang 42 projecting radially from its rounded end and fitting within a fulcrum opening 43 in the sidewall of tube 16. The opposite end of clutch plate 40 is notched at 44 to accommodate the clutch operating wire or tension member 45 extending throughout the major length of tube 16. This wire and its mode of support will be described more fully presently.

The tempered clutch plate 40 has an arcuate free edge 46 which is sharp and substantially harder than the metal of tube 15. This end of the clutch plate projects through a half circular slot 47 formed in the sidewall of tube 16 and into position to engage the interior surface of upper tube 15. Clutch plate 40 has an overall length slightly greater than the internal diameter of tube 15. For this reason it is not possible for the clutch plate to pivot upwardly to a plane normal to the tube axis.

Clutch plate 40 is urged to pivot upwardly approaching a horizontal position by an underlying compression spring 49 resting on a member 50 supported by a roll pin 51 supported in the sidewalls of tube 16. Overlying clutch plate 40 is a tension spring 53 having its upper end supported by roll pin 54 and its lower end engaged with the loop 56 at the upper end of the clutch operating wire 45. The upper end of wire 45 passes loosely through a short length of tubing 55 normally resting against the upper side of the clutch plate. It will be noted that the upper end of spacer tube 55 is normally immediately below and out of contact with loop 56 of wire 45 thereby leaving clutch plate 40 free to pivot upward and interlock with tube 15.

However, when the operating wire 45 is pulled downwardly only slightly by clockwise pivoting of handle 61, the end 56 of wire 45 engages the upper end of tube 55 thereby pivoting the clutch plate 40 downwardly about the fulcrum provided by tang 42 and opening 43. This assures positive disengagement of the clutch when the operator wishes to adjust the position of the suspension tubes 15,16.

The lower end of the tension wire 55 is formed with a return bend loop 58 which passes through a slot-like opening 59 formed in a bottom of the cup-shaped portion 60 of the operating handle 61. The interior sidewalls of cup 60 have a loose fit over the outer end of tube 16. Slot 59 has a semi-spherical socket 62 seating a keeper member or ball 63. This keeper or retainer fits loosely within the return bend portion 58 of tension wire 45 and cooperates in holding the retainer seated in socket 62 (FIG. 5) under the resilient tension supplied by spring 53. This same spring tension also maintains operating handle 60,61 seated against the end of tube 16. The rim edge of tube 16 is notched to straddle a radial rib 66 cast integral with the interior bottom of cup 60 thereby preventing rotation of the operating handle about the axis of tube 16. The bottom of this notch also serves as a fulcrum about which handle 61 pivots to release the clutch plate 40. A projection 68 extending outwardly from the bottom of cup 60 projects into the interior of tube 16 closely adjacent its sidewall and prevents counterclockwise pivoting of handle 61 as viewed in FIG. 2B.

The operation of the suspension assembly will be readily apparent from the foregoing description of its components and their operative relationship to one another. Normally, spring 49 urges the clutch plate to pivot counterclockwise about its fulcrum so that the sharp edge 46 bites into and interlocks with the inner surface of tube 15. When so locked, it will be readily apparent that tube 16 will support a substantial load and that any tendency to extend the two tubes relative to one another merely jams edge 46 into firmer locking contact with tube 15.

If the operator wishes to extend tube 16 downwardly, he merely grasps the operating handle 61 along with the adjacent portion of tube 16 and pivots the handle toward this tube about the edge of radial flange 66. The tension so applied to wire 45 extends spring 53 downwardly so that the looped end 56 of wire 45 engages tube 55 and forces the clutch plate to pivot clockwise and downwardly out of locking engagement with tube 15. Only a short pivotal movement is required for this purpose whereupon the operator may shift tube 16 upwardly or downwardly while retaining his firm grasp of handle 61 and the adjacent portion of tube 16. Once the suspension assembly is in the desired position the operator relaxes handle 61 permitting spring 49 to expand upwardly as spring 53 contracts. Only relatively slight upward pivotal movement of plate 40 is required to re-establish its locking engagement with tube 15.

If the operator merely wishes to retract the suspension assembly he need not necessarily operate handle 61, it merely being necessary to push upwardly against the bottom of cap 60. This serves to retract the lower tube 16 upwardly as the clutch plate pivots downwardly slightly and re-engages automatically as upwardly retraction movement ceases.

While the particular vertically adjustable suspension assembly herein shown and disclosed in detail is fully capable of attaining the objects and providing the advantages hereinbefore stated, it is to be understood that it is merely illustrative of the presently preferred embodiments of the invention and that no limitations are intended to the detail of construction or design herein shown other than as defined in the appended claims.

I claim:

1. An overhead vertically adjustable suspension assembly comprising: first and second tubes having a loose sliding fit and including stop means limiting extension thereof, means for suspending the outer end of said first tube from a support for said assembly, clutch means movably housed within said second tube near the inner end thereof having a sharp hardened edge positioned to jam against the interior of said first tube and lock said tubes against relative extension, said clutch means including means normally biasing the same toward locking position, and means concealed within said second tube and including manually operable handle means adjacent the lower end of said second tube cooperating to hold said clutch means in the non-locking position thereof while said tubes are being moved to a different axially adjusted position.

2. A suspension assembly as defined in claim 1 characterized in that said handle means is positioned along the side of and at the outer ends of said second tube, and said handle means being movable toward the axis of said second tube to release said clutch means.

3. A suspension assembly as defined in claim 1 characterized in that said handle means includes a cap portion normally held seated over the outer end of said second tube.

4. A suspension assembly as defined in claim 1 characterized in that said handle means is held movably seated against the outer end of said second tube by spring means housed within the inner end of said second tube.

5. A suspension assembly as defined in claim 4 characterized in that said clutch operating means includes a tension wire having one end operatively connected to said clutch means and having a return bend at its opposite end embracing keeper means socketed in an opening in the bottom of said cup-shaped portion of said handle means.

6. A suspension assembly as defined in claim 1 characterized in that said means for operating said clutch means includes a tension member operatively connected at its inner end to said clutch means, and said handle means including ball and socket means holding the other end of said tension member detachably assembled to said handle means.

7. A suspension assembly as defined in claim 6 characterized in that said handle means is generally L-shaped, the shorter leg of said handle means being cup-shaped and sized to seat on the outer end of said second tube, the junction of said handle legs cooperating with the adjacent area of said second tube to provide a fulcrum for limited pivotal movement of said handle to operate said clutch means, and said ball and socket means being located in the bottom of the cup-shaped portion of said handle means.

8. A suspension assembly as defined in claim 1 characterized in the provision of trolley means supported crosswise of the outer end of said first tube adapted to provide a rolling support for said assembly in a horizontally supported track for said trolley means.

9. A suspension assembly as defined in claim 8 characterized in the provision of keeper pivot pin means holding said trolley means detachably assembled to the outer end of said first tube.

10. A suspension assembly as defined in claim 1 characterized in the provision of bracket arm means adjustably supported on the exterior of said second tube and adapted to support items useful in treating a patient confined to bed.

11. A vertically adjustable suspension assembly comprising: first and second tubes having means holding the same telescopically assembled in a loose sliding fit, said second tube having an opening through its wall near the inner end thereof, a clutch plate extending crosswise of said second tube with one end fulcrumed thereon and its sharp edged opposite end extending through and slightly beyond the exterior side of said opening thereby to engage the juxtaposed wall portion of said first tube and lock said tubes positively against relative extension movement and to retain said clutch in assembled position, spring means normally urging said clutch plate toward locking position, and manually operable means including handle means at the outer end of said second tube for pivoting said locking plate out of locking engagement with said first tube and permitting said first and second tubes to be shifted to a different telescopic position.

12. A suspension assembly as defined in claim 11 characterized in that said handle means is movably supported at the outer end of said second tube and is movable toward one side of the latter to release said clutch plate.

13. A suspension assembly as defined in claim 11 characterized in that said handle means pivots about the rim end of said second tube and includes ball and socket means holding said handle means operatively connected to said clutch plate.

14. A suspension assembly as defined in claim 11 characterized in that the inner end of said second tube includes a thin walled sleeve fixed to the exterior thereof and cooperating with the inwardly deflected rim edge of the inner end of said first tube to limit the extension of movement of said tubes relative to one another.

15. A suspension assembly as defined in claim 11 characterized in that said clutch plate has a tang projecting from one end adapted to extend into and rest against a fulcrum opening therefor in the wall of said second tube in an area generally diametrically opposite said first mentioned opening.

16. A suspension assembly as defined in claim 15 characterized in that said opening through the wall of said second tube accommodating said clutch plate is large enough to permit assembly of said clutch therethrough prior to the telescopic assembly of said first and second tubes whereupon said tubes cooperate to hold said clutch plate in assembled position without need for retainer means.

17. A suspension assembly as defined in claim 11 characterized in the provision of means holding a suspension trolley assembly secured to the outer end of said first tube which trolley assembly is adapted to operate lengthwise of a horizontal trackway secured to a ceiling.

18. A suspension assembly as defined in claim 17 characterized in the provision of a keeper pin means holding said trolley assembly detachably to the outer end of said first tube and including non-metallic resilient sleeve means interposed between said trolley assembly and said first tube.

* * * * *